United States Patent [19]

Ohkuni

[11] Patent Number: 5,176,770
[45] Date of Patent: Jan. 5, 1993

[54] PNEUMATIC BELTED TIRES FOR MOTORCYCLES

[75] Inventor: Shinichiro Ohkuni, Akishima, Japan

[73] Assignee: Bridgestone Corporation, Tokyo, Japan

[21] Appl. No.: 702,740

[22] Filed: Jan. 6, 1989

Related U.S. Application Data

[63] Continuation of Ser. No. 779,551, Sep. 24, 1985, abandoned.

[30] Foreign Application Priority Data

Oct. 2, 1984 [JP] Japan .............. 59-205648

[51] Int. Cl.⁵ .............. B60C 9/22
[52] U.S. Cl. .............. 152/530; 152/531; 152/533; 156/117
[58] Field of Search .............. 152/530, 531, 533, 535, 152/538, 526, 527; 156/117

[56] References Cited

U.S. PATENT DOCUMENTS

| | | | |
|---|---|---|---|
| 3,467,161 | 9/1969 | Menell et al. | 152/526 |
| 3,504,724 | 4/1970 | Sperberg | 152/530 |
| 3,796,247 | 3/1974 | Martin, Jr. | 152/530 |
| 4,399,187 | 8/1983 | Holroyd et al. | 152/533 X |
| 4,510,983 | 4/1985 | Ohkuni et al. | 152/209 R |

FOREIGN PATENT DOCUMENTS

| | | |
|---|---|---|
| 1198691 | 8/1965 | Fed. Rep. of Germany . |
| 2706998 | 8/1978 | Fed. Rep. of Germany ...... 152/558 |
| 3231547 | 3/1984 | Fed. Rep. of Germany . |
| 3231548 | 3/1984 | Fed. Rep. of Germany . |
| 1222759 | 2/1971 | United Kingdom . |
| 1487426 | 9/1977 | United Kingdom . |
| 2120179 | 11/1983 | United Kingdom . |
| 2121736 | 1/1984 | United Kingdom . |

OTHER PUBLICATIONS

European Rubber Journal, vol. 166, No. 8 (Sep. 1984), p. 40, "Talking Tyres: Two-Wheeled Radials".

Primary Examiner—Geoffrey L. Knable
Attorney, Agent, or Firm—Sughrue, Mion, Zinn, Macpeak & Seas

[57] ABSTRACT

A pneumatic belted tire for motorcycle is disclosed, which comprises as a casing reinforcement a carcass composed of at least one ply containing organic fiber cords arranged at 70°–90° with respect to the mid-circumference of the tire and a belt composed of a belt layer containing a cord with a modulus of elasticity of not less than 600 kgf/cm² helically arranged at a slightly inclined angle with respect to the mid-circumference of the tire. In the tire of this type, the belt is composed of at least two belt segments parted at the mid-circumference of the tire and having a helically winding arrangement of at least one cord, and has a width corresponding to 0.5–1.1 times of a tread width, wherein the cord directions of these segments are opposite to each other with respect to the mid-circumference.

7 Claims, 3 Drawing Sheets

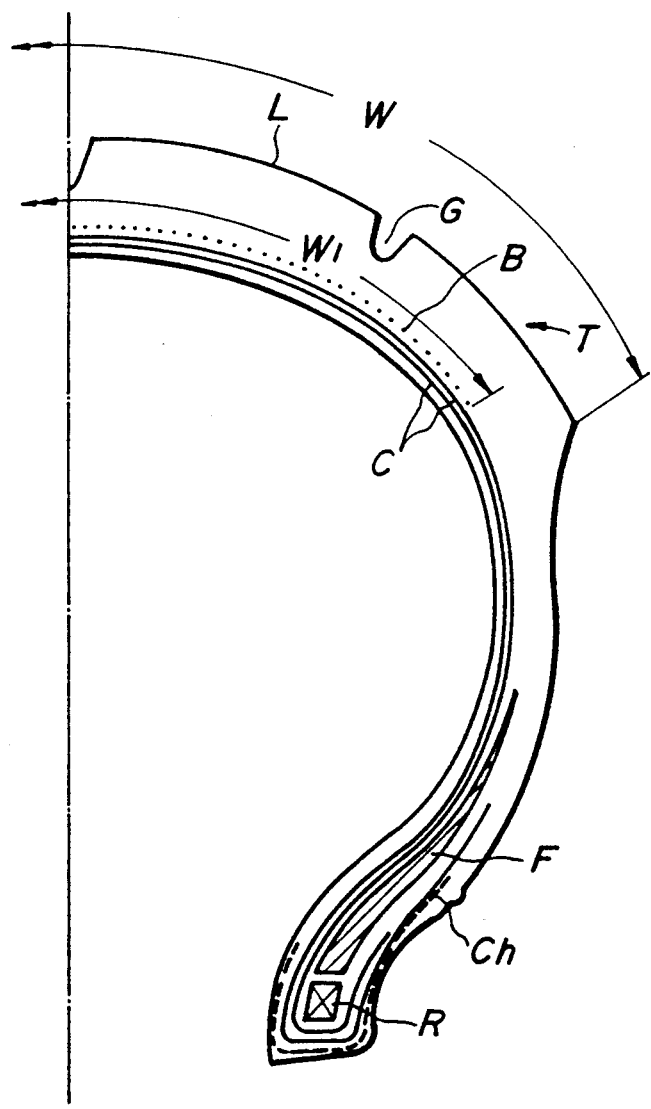
FIG_1b

FIG_2
PRIOR ART
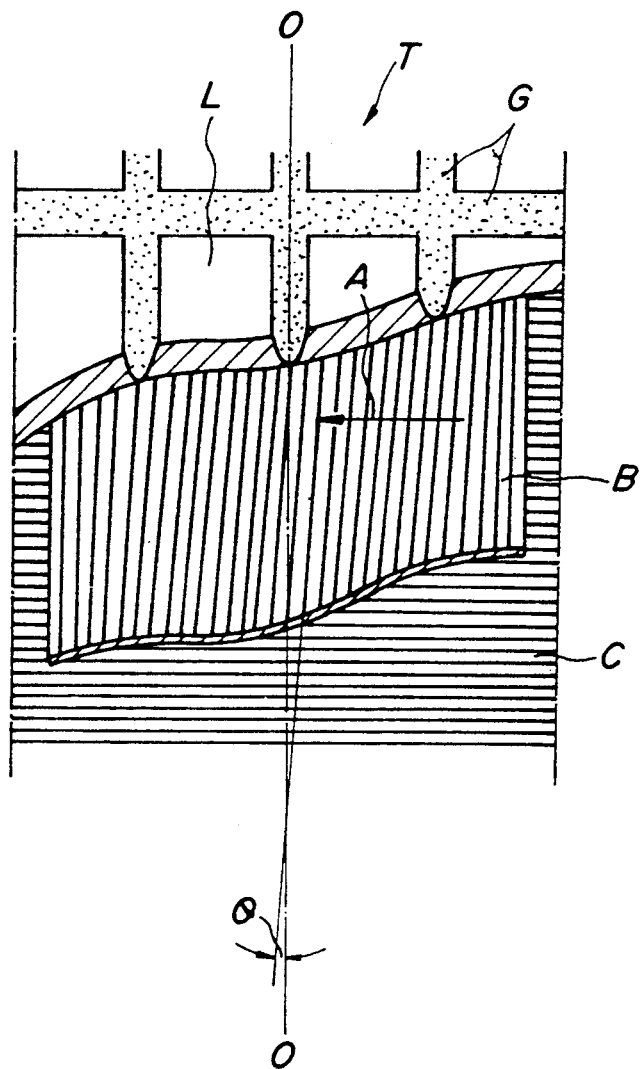
FIG_3
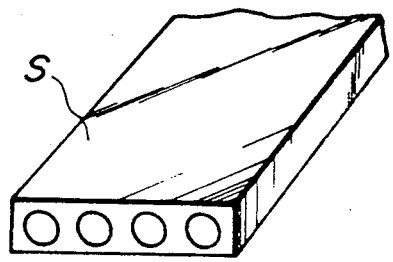

PNEUMATIC BELTED TIRES FOR MOTORCYCLES

This is a continuation of Ser. No. 06/779.551, filed on Sep. 24, 1985, now abandoned.

BACKGROUND OF THE INVENTION

1. Field of the Invention

This invention relates to pneumatic belted tires for motorcycles. More particularly it relates to an improvement of a belt structure in this type of tire which ensures tire performance inherent to the motorcycle and particularly realizes the effective enhancement of straight running performance without deterioration of cornering performances.

2. Related Art Statement

The development of pneumatic belted tires for motorcycles has been actually backward as compared with pneumatic belted tires for four-wheeled vehicles. This is because of the cornering properties inherent to the motorcycle or peculiar behaviors under a unique driving operation capable of effecting the turning by a camber angle, which is different from the case of ordinary passenger cars.

For this reason, when a predetermined camber angle is given to a tire for motorcycle having the same belt structure as the tire for passenger car, not only is the smooth tread gripping never obtained due to the rigidity of the central portion of the belt and the discontinuity of rigidity near the belt end, but also the feeling of weak stiffness appears during the cornering, which cause troubles in the steering response and stability.

As a countermeasure against the above problems, there has been proposed a belt composed of a belt layer containing cords arranged substantially in parallel to the mid-circumference of the tire (hereinafter referred to as a circumferential cord) in Japanese Utility Model laid open No. 58-160.805.

Such a belt structure certainly enables the smooth cornering and is advantageous in the steering response and the stability. However, since the belt layer is formed by helically winding a single circumferential cord from one widthwise end of a tire tread to the other end thereof, the circumferential cord is regularly inclined at an extremely small angle ($\theta$) with respect to the mid-circumference of the tire, which brings about the occurrence of plysteer in the straight running together with a relatively thin tread rubber peculiar to the tire of this type and tends to obstruct straight running performance.

Further, a step of helically winding the single cord over a region extending from one widthwise end of the tread to the other end thereof is complicated, which is unfavorable from a viewpoint of the productivity.

SUMMARY OF THE INVENTION

It is, therefore, an object of the invention to provide a pneumatic belted tire for motorcycles which eliminates the aforementioned drawbacks of the conventional belt structure containing the circumferential cord arranged substantially in parallel to the mid-circumference of the tire and greatly enhances straight running performance together with the improvement of cornering performances.

The inventors have made studies in order to simultaneously solve the problems on the plysteer and the productivity, and found that these problems are effectively eliminated by dividing the belt into two right and left belt segments at the mid-circumference of the tire and helically and separately arranging 1 to 5 cords as a unit in each of these belt segments.

According to the invention, there is the provision of in a pneumatic belted tire for motorcycle comprising a pair of sidewalls, a tread toroidally extending between the sidewalls up to positions corresponding to a tire maximum width at substantially an equal thickness, a carcass reinforcing the sidewalls and the tread and composed of at least one ply containing organic fiber cords arranged at a cord angle of 70°-90° with respect to the mid-circumference of the tire, and a belt superimposed about a crown portion of the carcass and composed of a belt layer containing a cord with a modulus of elasticity of not less than 600 kgf/cm² helically arranged at a slightly inclined angle with respect to the mid-circumference of the tire, the improvement wherein said belt is composed of at least one belt layer consisting of at least two belt segments each having a helically winding arrangement of at least one cord, the cord directions of which segments being opposite to each other with respect to the mid-circumference, and has a width corresponding to 0.5-1.1 times of a tread width.

The term "modulus of elasticity of cord" used herein means to be calculated by the following equation (1) when a relation between load and elongation is measured by applying a tensile force to the cord and a rising slope of the measured load-elongation curve is extended from this curve to determine a load at 10% elongation:

$$\text{Modulus of elasticity} = \frac{F \cdot 10}{S} \qquad (1)$$

wherein F is a load at 10% elongation and S is a sectional area of cord.

According to the invention, organic fiber cords as well as steel cord may be used as the cord for the belt. Among the organic fiber cords, the use of aromatic polyamide fiber cords, particularly Kevlar cord (trade name, made by Du Pont Nemours, E.I.) is preferably, and polyester cord, rayon cord and the like may be used.

In case of the steel cord, it is preferable to use steel cords obtained by twisting about 6-25 steel filaments each having a diameter of not more than 0.15 mm.

BRIEF DESCRIPTION OF THE DRAWINGS

FIG. 1b is a schematically sectional view taken along a line X—X of FIG. 1a;

FIG. 2 is a developed view of the conventional tire; and

FIG. 3 is a partial perspective view of a strip constituting the belt.

DESCRIPTION OF THE PREFERRED EMBODIMENT

Figure 1A:
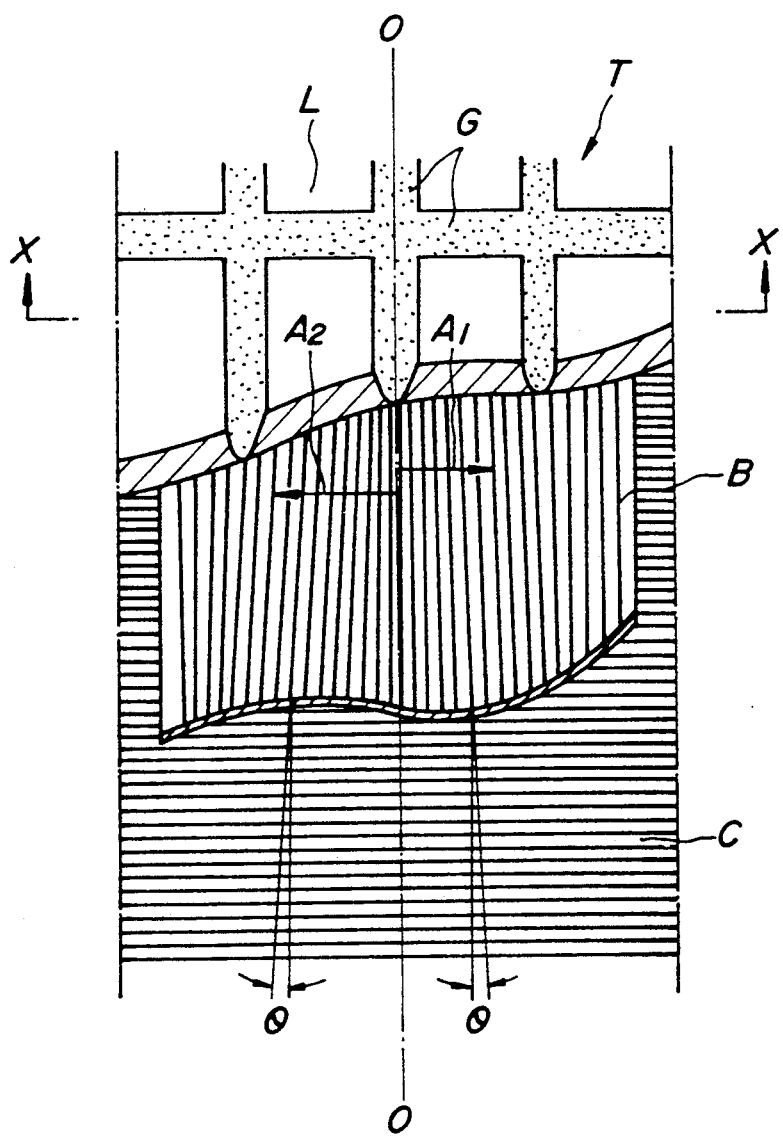
FIG. 1a is a developed view of an embodiment of the tire according to the invention illustrating the arrangement of tread, belt and carcass.

The pneumatic belted tire for motorcycle according to the invention comprises a belt B, a carcass C and a tread T having an outward convex and relatively round profile and extending up to positions corresponding to a maximum tire width W as shown in FIGS. 1a and 1b. This tire is substantially the same with the conventional tire for motorcycle shown in FIG. 2 in a point that the tire casing is reinforced with the carcass C composed of at least one ply containing cords of an organic fiber such as nylon fiber, rayon fiber or the like arranged at a cord angle of 70°–90° with respect to a mid-circumference O—O of the tread T and the belt B superimposed about the crown portion of the carcass C and having a helically wound cord arrangement of a slight inclination angle with respect to the mid-circumference. In these figures, symbol G is a tread main groove and symbol L is an island block defined by the tread main grooves G.

Heretofore, the belt B has been formed by helically winding a single cord around the carcass C from one end of the belt to the other end thereof in a direction of an arrow A as shown in FIG. 2. In this case, the wound cord is slightly inclined at a cord angle $\theta$ with respect to the mid-circumference O—O, but this angle $\theta$ is very small, so that the cord can be said to be substantially in parallel to the mid-circumference O—O. However, since the cord is slightly inclined with respect to the mid-circumference of the tire, the so-called plysteer based on such an inclination angle $\theta$ is caused to injure the straight running performances of the motorcycle as previously mentioned.

According to the invention, such a plysteer is advantageously avoided as follows.

That is, the belt B is composed of two belt segments parted at the mid-circumference O—O of the tread T and having a helically winding arrangement of plural cords, the cord winding directions of which segments being opposite to each other as shown by arrows $A_1$ and $A_2$ in FIG. 1a, and has a width $W_1$ corresponding to 0.5–1.1 times of a tread width W.

As apparent from FIG. 1b, each tread width W and the belt width $W_1$ is represented by a length of a curved line along a curvature of the crown portion. According to the invention, it is preferable that each belt segment of the belt B is formed by helically winding a ribbon strip S with a width corresponding to one-whole number of the belt width $W_1$ as shown in FIG. 3, which is a rubberized strip containing plural cords, for example, 2–10 cords, preferably 3–6 cords arranged in parallel with each other, around the carcass C in the arrow direction $A_1$ or $A_2$ from the mid-circumference O—O of the tread toward the side edge thereof. Of course, the cord or strip may be wound from each side end of the belt B to a terminus along the mid-circumference of the tread. In any case, it is desirable that the cord cut ends appearing in both ends of the belt segment are alternately arranged between both half regions of the belt B as far as possible.

Thus, although the cord angle $\theta$ of the belt B is substantially parallel to the mid-circumference of the tread, it is slightly inclined thereto, but the direction of cord angle is opposite at both sides with respect to the mid-circumference. Thus, the cause of so-called plysteer is drastically eliminated.

According to the invention, the reason why the cord angle of the carcass ply is limited to 70°–90° is based on the fact that the reinforcing effect is obtained by the radial structure of the carcass and that when the angle is smaller than 70°, the carcass structure becomes near the bias structure.

The reason why the modulus of elasticity of the cord in the belt is restricted to not less than 600 kgf/cm$^2$ as defined above is due to the fact that when the modulus of elasticity is less than the above value, the rigidity required for the belt reinforcement cannot be obtained.

According to the invention, the cord angle of the helically wound cord with respect to the mid-circumference of the tread T is opposite at the right-side and left-side belt segments constituting the belt B, so that the plysteers resulted from these cord angles are offset with each other to be apparently zero, whereby the straight running stability of the motorcycle is improved considerably.

EXAMPLE

In order to confirm the performances of the pneumatic belted tire for motorcycle, comparison test was made under the following conditions using a front-wheel tire of 3.25 H 19 and a rear-wheel tire of 4.00 H 18. Since the structure of the belt B was common in the front- and rear-wheel tires, a tire to be tested as shown in FIGS. 1a and 1b was manufactured with respect to only the rear wheel as follows.

The carcass C was composed of two plies each containing polyester cords of 1500 d/2 arranged at 90° with respect to the mid-circumference of the tread T and had a so-called radial arrangement.

The belt B was formed by winding Kevlar cord of 1500 d/2 with a modulus of elasticity of 4000 kgf/cm$^2$ around the carcass C at a thread count of 34 cords/50 mm over a width corresponding to 0.95 times of the tread width W, provided that the cord winding direction was opposite at the two belt segments constituting the belt B with respect to the mid-circumference.

As shown in FIG. 1b, the carcass C was wound around a bead core R from inside toward outside to form a turnup, and a rubber filler F was interposed between the carcass C and the turnup thereof, and a chafer $C_h$ made from a textile canvas was arranged outside the turnup.

A motorcycle provided with the test tire was run on a circuit course of 4.8 km at a maximum speed of 200 km/hr, during which the straight running performance and the cornering performance were evaluated by a feeling of an expert driver to obtain results as shown in the following table, which are represented by an index on a basis that the result of the conventional tire shown in FIG. 2 is 100.

|  | Conventional tire | Invention tire |
|---|---|---|
| Straight running performance | 100 | 109 |
| Cornering performance | 100 | 100 |

It has been confirmed from the above results that in the invention tire the straight running performance is considerably improved without troubles on the cornering performance.

As mentioned above, according to the invention, the degradation of the straight running performance due to the plysteer is properly avoided, while the cornering performance equal to or higher than that of the conventional tire is obtained.

What is claimed is:
1. A pneumatic belted motorcycle tire comprising; a pair of sidewalls, a tread toroidally extending between the sidewalls up to positions corresponding to a tire maximum width at substantially an equal thickness, a carcass reinforcing the sidewalls and the tread and com- posed of at least one ply containing organic fiber cords arranged at a cord angle of 70°-90° with respect to the mid-circumference of the motorcycle tire, and a belt superimposed about a crown portion of the carcass and composed of a belt layer containing a cord with a modulus of elasticity of not less than 600 kgf/cm² helically arranged at a slightly inclined angle with respect to the mid-circumference of the tire, said belt composed of at least one belt layer consisting of two belt segments divided at the mid-circumference of the tire each having a helically winding arrangement of at most 10 cords from the mid-circumference of the tire to axial widthwise ends of the belt segments, the cord inclination directions of which said segments being opposite to each other with respect to the mid-circumference and said belt having width corresponding to 0.5-1.1 times of a tread width.

2. The pneumatic belted motorcycle tire according to claim 1, wherein said cord for the belt is an organic fiber cord.

3. The pneumatic belted motorcycle tire according to claim 2, wherein said organic fiber cord is an aromatic polyamide fiber cord.

4. The pneumatic belted motorcycle according to claim 1, wherein said belt segment comprises a helically wound ribbon strip having a width corresponding to one-whole number of the belt width and containing 2 to 10 cords arranged in parallel with each other.

5. The pneumatic belted motorcycle tire according to claim 1 wherein said cord for the belt is a steel cord.

6. The pneumatic belted motorcycle tire according to claim 5, wherein said steel cord is formed by twisting 6 to 25 steel filaments each having a diameter of not more than 0.15 mm.

7. A pneumatic belted motorcycle tire comprising: a pair of sidewalls, a tread toroidally extending between the sidewalls up to positions corresponding to a tire maximum width at substantially an equal thickness, a carcass reinforcing the sidewalls and the tread and composed of at least one ply containing organic fiber cords arranged at a cord angle of 70°-90° with respect to the mid-circumference of the motorcycle tire, and a belt superimposed about a crown portion of the carcass and composed of a belt layer containing a cord with a modulus of elasticity of not less than 600 kgf/cm² helically arranged at a slightly inclined angle with respect to the mid-circumference of the tire, said belt composed of at least one belt layer consisting of two belt segments divided at the mid-circumference of the tire, each having a helically winding arrangement of at most 10 cords from the mid-circumference of the tire to axial widthwise ends of the belt segments, wherein cords cut ends are in both widthwise ends of each segment and said cord cut ends at both widthwise ends of said belt segments are alternatively arranged between half regions of said belt in different positions, and the cord inclination directions of such segments being opposite to each other with respect to the mid-circumference, and said belt having a width corresponding to 0.5-1.1 times of a tread width.

* * * * *